US006428029B1

(12) United States Patent
Barclay

(10) Patent No.: US 6,428,029 B1
(45) Date of Patent: Aug. 6, 2002

(54) WHEELCHAIR FRAME

(75) Inventor: Hugh W. Barclay, Kingston (CA)

(73) Assignee: Advanced Mobility Systems Corporation, Kingston (CA)

( * ) Notice: Subject to any disclaimer, the term of this patent is extended or adjusted under 35 U.S.C. 154(b) by 0 days.

(21) Appl. No.: 09/779,639

(22) Filed: Feb. 9, 2001

(51) Int. Cl.$^{7}$ ................................................ B62M 1/14

(52) U.S. Cl. ................ 280/250.1; 280/220; 280/304.1; 280/281.1

(58) Field of Search .......................... 280/250.1, 281.1, 280/907, 124.106, 124.13, 124.152, 124.166; D12/131

(56) References Cited

U.S. PATENT DOCUMENTS 3,917,312 A 11/1975 Rodaway
3,937,490 A 2/1976 Nasr
4,078,817 A 3/1978 Ferguson et al.
4,128,137 A 12/1978 Booth
4,190,263 A 2/1980 Powers
4,360,213 A 11/1982 Rudwick et al.
4,455,031 A 6/1984 Hosaka
4,572,533 A 2/1986 Ellis et al.
4,650,201 A 3/1987 Hartwell
4,684,149 A 8/1987 Meyer
4,852,899 A * 8/1989 Kueschall ................ 280/250.1
4,861,056 A * 8/1989 Duffy, Jr. et al. ........ 280/250.1
5,064,211 A 11/1991 Huttenhuis et al.
5,076,390 A * 12/1991 Haskins ................... 280/250.1
5,152,543 A 10/1992 Sims et al.
5,259,635 A * 11/1993 Picker ..................... 280/250.1
5,292,144 A * 3/1994 Sosnoff ................... 280/304.1
5,326,120 A * 7/1994 Weege ...................... 280/250.1
5,727,802 A 3/1998 Garven, Jr. et al.
5,855,387 A 1/1999 Gill et al.
6,070,898 A 6/2000 Dickiet et al.
6,161,856 A * 12/2000 Peterson .................. 280/250.1
6,206,393 B1 * 3/2001 Mascari et al. ............. 280/220

FOREIGN PATENT DOCUMENTS

FR 2455886 A * 1/1981
JP 07313554 A * 12/1995

* cited by examiner

*Primary Examiner*—Avraham Lerner
*Assistant Examiner*—Daniel Yeagley
(74) *Attorney, Agent, or Firm*—Adrian Zahl

(57) ABSTRACT

A wheelchair frame for flexing to accommodate irregularities in the ground consists of a generally rectangular structure having side rails joined by front and rear cross members. One of the cross members is rigid, and receives the side rails through apertures which permit rotation of the side rails within the cross member. The second cross member consists of a tube in tube arrangement or other such coupling for permitting rotation of the cross member relative to the side rails. The rigid cross member may be slidably displaced along the side rails for changing the wheelbase of the wheelchair. A wheelchair seat from may be mounted to the rectangular frame by means of fore and aft struts which permit movement of the seat frame relative to the lower rectangular frame to accommodate flex of the lower frame, while also providing a tilt function for the seat frame.

9 Claims, 2 Drawing Sheets

WHEELCHAIR FRAME

FIELD OF THE INVENTION

The present invention relates to wheelchairs, particularly to wheelchair frames for supporting the wheels, seat and foot rest assemblies.

BACKGROUND OF THE INVENTION

Hand-propelled wheelchairs generally include a frame supporting a pair of drive wheels at the rear end and a pair of caster wheels at the front end. The drive wheels and the caster wheels are generally rigidly supported by the wheelchair frame. The drive wheels make contact with the ground and are hand-driven to propel the wheelchair. The wheelchair supports a seat assembly comprising a seat and a backrest. The seat assembly is oriented above and between the rear drive wheels and the front caster wheels so as to provide stability.

Motor-driven wheelchairs differ in that the front and rear wheels are typically of the same or similar size. The front wheels are controlled by a steering means operable by the user, rather than being caster wheels. Further, in order to support the motor and batteries, the wheelchair frame is typically built more rugged.

Many wheelchairs utilize rigid frames. Indeed, rigid frames present the advantage of being light weight and simple. However, problems arise when a wheelchair utilizing a rigid frame is required to negotiate obstacles or uneven ground surfaces; the drive wheels and the caster wheels may fail to maintain full contact with the ground. A rigid framed wheelchair may be more difficult to propel over obstacles. Further, the relative height of wheelchairs can result in precarious angles of lean as the wheels roll over obstacles, in the absence of means for independent vertical travel of the wheelchair. Moreover, the rigid frame tends to torque in an effort to conform to uneven surfaces. These torsional stresses on the main frame take their toll over many minor cycles and result in frame failures. Various attempts have been made to overcome this problem, specifically, various devices have been proposed for minimizing the forces that are transmitted through the chair to the user.

One attempt consists of modifying an existing wheelchair in order to incorporate a shock absorbing device into the initial design of the wheelchair. For example, U.S. Pat. No. 4,572,533 to Ellis et al. discloses a shock absorbing apparatus comprising one or more spring assemblies attached to the frame in order to cushion shock on respective wheels of the wheelchair. U.S. Pat. No. 5,855,387 to Gill et al. discloses a wheelchair with multiple shock absorbing means. A rear swing axle is pivotally connected to the seat frame and a spring shock absorber controls the relative movement therebetween. A front suspension is connected to the seat frame separately from the rear suspension and includes a floating beam carrying the front castor wheels and pivotally connected to the seat frame by four link control arms. Three shock absorbers acting between the front of the seat frame and the floating beam allow controlled vertical movement of the floating beam. Numerous other patents disclose wheelchairs equipped with shock absorbing devices including U.S. Pat. No. 4,190,263 to Powers; U.S. Pat. No. 4,078,817 to Ferguson et al.; U.S. Pat. No. 4,861,056 to Duffy, Jr. et al.;U.S. Pat. No. 4,455,031 to Hosaka; and U.S. Pat. No. 3,917,312 to Rodaway. However, it has been found that such shock absorbing devices add weight and become maintenance problems.

Another attempt to provide a wheelchair with good contact between the wheels and the ground surface is described in U.S. Pat. No. 4,128,137 to Booth. This patent discloses a suspension comprising a plate carrying a wheel unit and a bogie system. The bogie system comprises two bogie units. Each bogie unit includes a drive wheel and a caster wheel attached to a frame member. The frame members pivot about a common transverse axis defined by brackets mounted to the plate to maintain contact with the ground surface.

In another attempt to ensure that a wheelchair retains good stability, a wheelchair with a frame having the capacity to flex has been envisaged. U.S. Pat. No. 5,064,211 to Huttenuis et al. discloses a flexible wheelchair frame comprising two side frame members, joined together by front and rear frame members which freely rotate relative to the side frames to permit flexure of the frame.

A central member joining the front and rear members causes the side frames to pivot in such a way that tilting of one of the side frames in one direction causes tilting of the other side frame through the same angle in the other direction, while the central member remains stationary.

One drawback to the arrangement in Huttenuis et al. is that in the absence of a monolithic rear cross member with a large box like sectional configuration it is difficult for the wheelchair to bear the weight of a heavy passenger. In order to compensate, other frame components must be enlarged, rendering the overall structure heavy and complex to manufacture.

A need that is not well addressed by the prior art, is to provide a wheelchair frame that freely torques or flexes to accommodate irregularities of the ground while maintaining wheelchair stability, while also being relatively simple and inexpensive to manufacture. A further need is to provide a convenient means to adjust the wheelbase of a wheelchair. This need is not addressed in the art.

SUMMARY OF THE INVENTION

The present invention is a wheelchair frame that has the capacity to flex sufficiently to absorb ground irregularities, while alleviating at least some of the drawbacks of the prior art. The wheelchair frame comprising side rails as well as front and rear cross members. The side rails are able to rotate relative to the front and rear cross rails in such a way as to permit the front and rear cross members to independently tilt go out of parallel alignment when viewed from the front or back.

One embodiment of the invention is a wheelchair frame assembly having a front end and a rear end and lateral sides, said wheelchair frame assembly comprising:

- a first of the cross members comprising a rigid member having an aperture on either end thereof to receive the side rails such that both of the rails may rotate within the apertures and the cross member may adjustably move along the side rails to change the effective wheelbase length of the frame; and
- a second of the cross members being rotatable axially relative to said side rails to permit the side rails to angle vertically independently of each other.

The first cross member thus rotates about the axis of each side rail, while the second of cross member rotates about its own axis relative to the side rails.

Preferably, the first cross member is at the rear of the frame and the second cross member at the front.

The second cross member preferably comprises a tube-in-tube arrangement rigidly joined at either end to the side rails. Preferably, an elastic sleeve such as a plastic tube joins the two components of the second cross member to provide anti-torque bias to the member.

When assembled into a wheelchair, caster wheels are mounted to the front end of the frame and drive wheels are mounted to the rear.

The invention further comprises a wheelchair having a frame as defined above, along with a seat assembly, wheels and optionally a footrest assembly.

Other features and advantages of the present invention will become more apparent from the following detailed description, taken in conjunction with the accompanying drawings which illustrate, by way of example, the principles of the invention.

DETAILED DESCRIPTION OF THE PREFERRED EMBODIMENT

Figure 1:
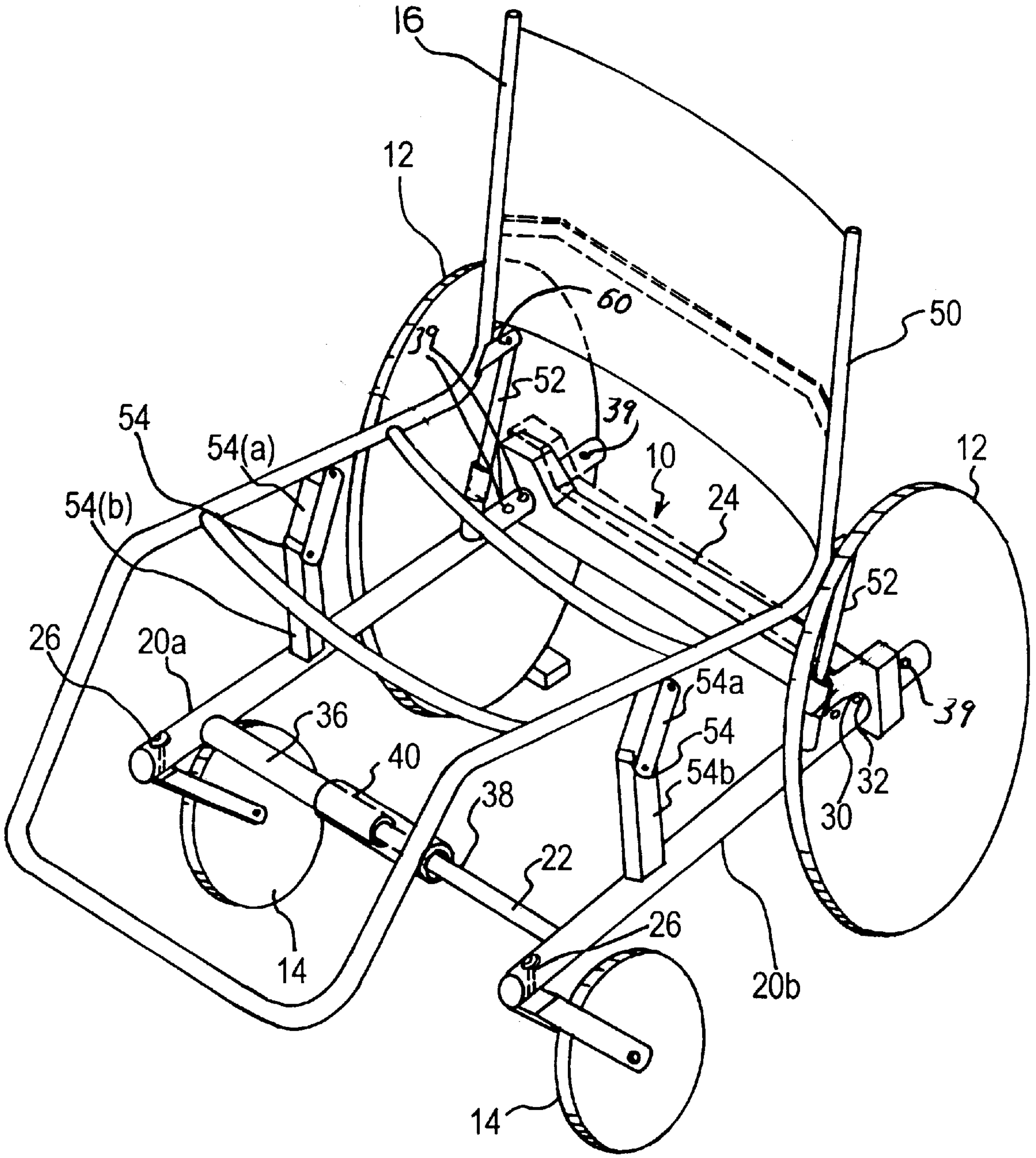
FIG. 1 is a perspective view of a preferred embodiment of the invention.
Figure 2:
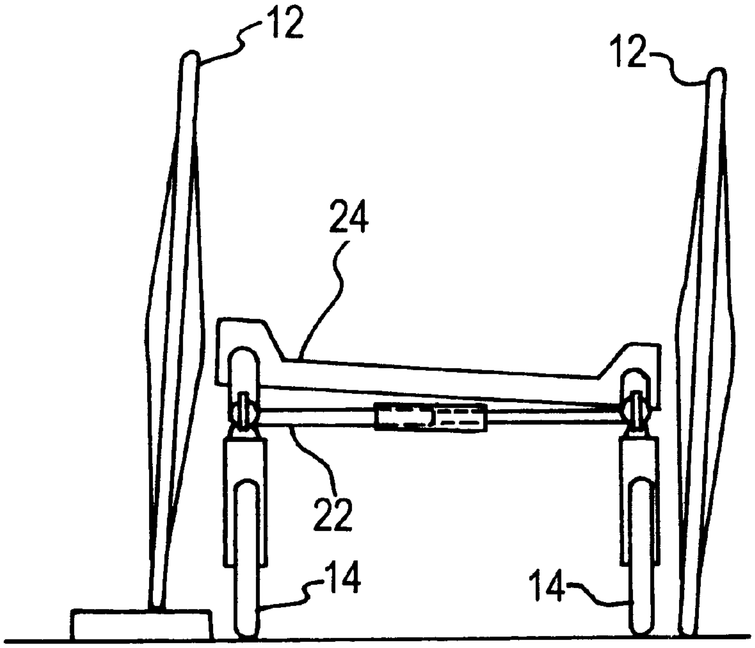
FIG. 2 is a front elevational view of a preferred embodiment of the invention, with the seat, backrest and footrest assembly omitted.
Figure 3:
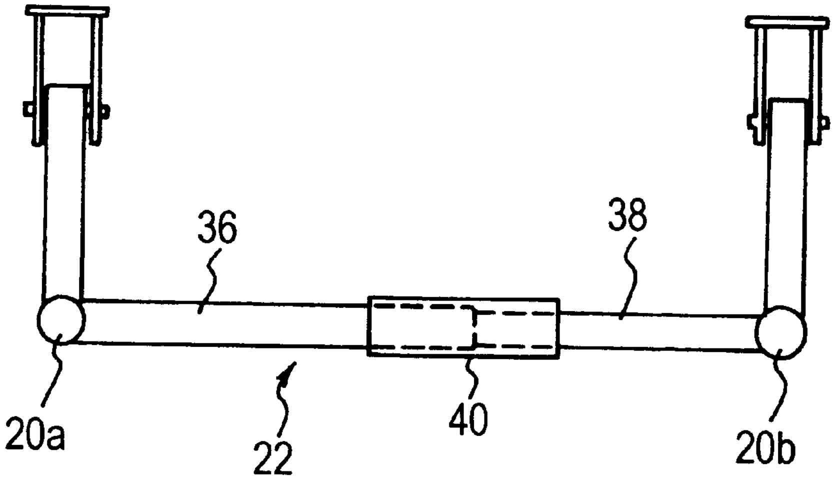
FIG. 3 is a front elevational view of a wheelchair frame, with the wheels omitted.

A preferred embodiment of the invention is illustrated in FIGS. 1 to 3. The figures show a lower wheelchair frame 10, supporting rear drive wheels 12, and front swivel or caster wheels 14. As shown, the rear wheels 12 are hand-propelled and are thus substantially larger than the front wheels for gripping purposes. The frame supports a conventional seat, backrest and footrest assembly 16. An upper frame 50, discussed below, supports a seat and related components.

The frame 10 is generally an open rectangular structure, composed of spaced apart lateral side rails 20(*a*) and 20(*b*), which are tubular, joined by front and rear cross members 22 and 24. The front caster wheels 14 are mounted at a forward end of the side rails, by way of a mounting bracket 26 attached to the underside of each side rail adjacent to the forward end thereof. The rearwheels 12 are rotatably mounted at opposing ends of the rear cross member 24. The mount means are not shown, but are conventional.

The rear cross member 24 is generally rectangular in section, and is suitably large to provide a degree of rigidity to the structure. The rear cross member supports most of the weight of the wheelchair passenger, and thus requires a high degree of strength and rigidity. A hollow box like structure is well suited for this purpose.

In the result, since most of the weight of the passenger is borne by a single monolithic structural member, i.e. the rear cross member, the frame as a whole is relatively light weight and simple to manufacture.

An aperture 30 extends through the rear cross member at either end thereof, the axis of which is horizontal and extends from the front to the rear side of the rear cross member. The side rails 20(*a*) and 20(*b*) are received in these apertures, and the aperture is of a suitable size to permit free rotation of the cross members therein. One or more bushings 32 within the aperture to frictionally engage the side rails to minimize wobble and prevent unwanted axial slippage of the rear cross member along the side rails. The bushings are suitably sized to permit axial adjustment of the rear cross member relative to the side rails. Adjustment of the wheelchair wheel base is effected by moving the rear cross member forward and rearward. Pin or bolts or other stoppers 39 spaced at intervals are used to prevent unwanted fore and aft movement of the rear cross member along the side rails.

Thus, the wheelbase of the wheelchair may be adjusted. This is appropriate for certain applications. For example, if it is desired to use the wheelchair over particularly rough ground, it may be desirable to lengthen the wheel base. As well, if the wheelchair user is particularly tall or heavy, a longer wheelbase may be desirable.

The front cross member 22 is rotatable relative to the side rails 20(*a*) and 20(*b*), about its own axis. In the preferred embodiment, this is accomplished by providing a tube-in-tube arrangement for the front cross member, wherein the front cross member is composed of left and right portions 36 and 38 joined at the middle. Either end of the front cross member is rigidly fixed to a corresponding side rail. A flexible plastic tube 40 covers the junction between the left and right portions, and fits over the cross member reasonably tightly to hold the two portions together, and provides a degree of resistance to the free rotation of the two portions.

It will be seen that the side rails 20(*a*) and 20(*b*) are thus capable of angular displacement within a vertical plane, independently of each other, as shown by the broken line in FIG. 1. When one of the wheels encounters an obstacle independent angular displacement occurs, such as is shown in FIG. 1 in which the right rear wheel encounters an obstacle. When this occurs, the rear cross member rotates with the upward travel of the rear wheel. The resulting displacement of the side rail on the same side causes a slight axial rotation of the side rail within its aperture 30. The front cross member 22 also undergoes a corresponding small rotation of the tube-in-tube junction to accommodate the relative angular displacement of the side rails 20(*a*) and 20(*b*). A similar movement occurs when an obstacle is encountered by one of the front wheels.

The angular displacement of the side rails 20(*a*) and 20(*b*) relative to each other permits the frame 10 to flex without stress on any of the frame members. It also permits all four wheels to remain in contact with the ground when any single wheel encounters an obstacle.

It will thus be seen that the ability of the arrangement to accommodate ground irregularities prevents undue strain on the wheelchair frame, particularly when the passenger is heavy. It also increases the stability of the wheelchair.

The wheelchair frame 10 supports an upper frame 50 upon which is mounted the seat, backrest and footrest assembly (not shown). The upper frame 50 is supported above the lower frame 10 by two pairs of opposed struts, consisting of rear struts 52 and forward struts 54.

The upper frame 50 comprises a rigid tubular metal frame supported by and elevated above the lower wheelchair frame 10 by means of the two pairs of struts 52 and 54. All four members are mounted to and extend vertically upwardly from the side rails 20, with a rigid non-pivoting connection. The rear struts 52 are extendible in length. Each rear strut consists of a tube in tube member. At their upper ends, the rear struts are each pivotally mounted to pivot mounts 60 extending rearwardly from the assembly 50.

The front struts 54 are each similarly rigidly mounted at their lower ends to the side rails 20(*a*) and 20(*b*) and pivotally mounted at their upper ends to the footrest assembly 50. The front struts 54 each comprises upper and lower members 54(*a*) and 54(*b*) hinged to each other to permit folding movement of the forward struts.

The rear struts 52 are disposed at a rearwardly sweeping angle relative to the side rails 20(*a*) and 20(*b*) of about 10° from the vertical whilst the lower portion 54(*b*) of the front struts extend substantially vertically upwards. The front and rear struts thus diverge upwardly. The upper part 54(*a*) of the front struts is positioned to angle rearwardly at an angle greater than 10°. The divergence between front and rear struts resists collapse of the seat assembly 50 as any folding of the forward struts is resisted by the inability of the upper frame 50 to move forwardly relative to the lower frame 10. The arrangement permits a measure of independent movement of the upper assembly 50 relative to the lower frame 10, to accommodate flex of the lower frame 10 without stressing the upper frame. The arrangement further permits tilting of the upper wheelchair frame 50 by providing sufficient force to move the upper frame 50 forwardly or rearwardly relative to the lower frame, which also causes the rear struts to slide within themselves to change their length. This then changes the strut geometry and permits the upper frame to tilt in the forward or rearward direction relative to the lower frame.

All of the frame components may be made from a suitable material such as tubular steel or aluminum. Further, since the design of the frame minimizes stress, it is contemplated that the frame may be made from moulded plastic.

It is not intended that the foregoing description of the preferred embodiment is limitative of the invention. It will be apparent to one skilled in the art that modifications may be made to the embodiment described above. The full scope of the invention is set forth in the accompanying claims.

I claim:

1. A wheelchair frame for supporting a wheelchair seat, backrest and footrest assembly and wheelchair wheels comprising an open, generally rectangular lower frame having lateral side members joined by front and rear cross members, a first of said cross members comprising a rigid unitary member having an aperture on either end thereof to rotatably and slideably receive said side members therethrough for a free axial rotation of said side members relative to said first cross member and for adjustable positioning of said first cross member along said side members, and a second of said cross members being rotatable axially relative to said side members, whereby said side members may be each angularly displaced on a vertical plane, independently of each other; and an upper frame for supporting said seat and backrest, said upper frame being supported above said lower frame by supports extending upwardly from said side members.

2. A wheelchair frame as defined in claim 1, wherein said first cross member is at the rear of said frame, and said second cross member is at the front of said frame.

3. A wheelchair frame as defined in claim 1, wherein said second cross member comprises a tube-in-tube arrangement rigidly joined at either end thereof to said side members.

4. A wheelchair frame as defined in claim 3 further comprising an elastic sleeve surrounding said second cross member to provide anti-torque bias to the free rotation of said second member.

5. A wheelchair frame as defined in claim 1, further comprising bushings within said apertures, for resisting sliding movement of said cross member along said side members.

6. A wheelchair frame as defined in claim 1, further comprising stoppers on said lateral side members, for adjustably controlling fore and aft movement of said first cross member.

7. A wheelchair frame as defined in claim 1, wherein said first cross member has a substantially rectangular cross section.

8. A wheelchair frame as defined in claim 1, wherein said supports comprise opposed forward and rear strut pairs extending upwardly from said lower frame, a first pair of said rear struts each being extendible lengthwise and non-pivotally mounted at a lower end to said lower frame and mounted at an upper end to said upper frame by a pivot mount, and a second pair of said forward struts each comprising a folding member non-pivotally mounted at a lower end to said lower frame and at an upper end pivotally joined to said upper frame, said lower end of said folding member and said extendible strut diverging outwardly from each other said extendible struts being angled away from the vertical for resisting collapse of said upper frame against said rectangular frame whilst permitting tilting of said upper frame relative to said lower frame.

9. A wheelchair frame as defined in claim 8, wherein said extendible struts are at the rear of said lower frame and sweep rearwardly and upwardly relative to said lower frame, said folding struts being mounted forwardly of said extendible struts and having a lower part mounted generally vertically and an upper part hinged to said lower part, said upper part being angled rearwardly and upwardly.

* * * * *